United States Patent
Koudal et al.

(10) Patent No.: US 8,266,957 B2
(45) Date of Patent: Sep. 18, 2012

(54) THERMAL FLOW MEASURING APPARATUS INCLUDING RTD SENSOR

(75) Inventors: Ole Koudal, Baden (CH); Chris Gimson, Reinach (CH); Oliver Popp, Fislisbach (CH)

(73) Assignee: Endress + Hauser Flowtec AG, Reinach (CH)

( * ) Notice: Subject to any disclaimer, the term of this patent is extended or adjusted under 35 U.S.C. 154(b) by 419 days.

(21) Appl. No.: 12/312,835

(22) PCT Filed: Nov. 30, 2007

(86) PCT No.: PCT/EP2007/063060
§ 371 (c)(1),
(2), (4) Date: Jan. 28, 2010

(87) PCT Pub. No.: WO2008/065186
PCT Pub. Date: Jun. 5, 2008

(65) Prior Publication Data
US 2010/0139390 A1    Jun. 10, 2010

(30) Foreign Application Priority Data
Dec. 1, 2006 (DE) .......................... 10 2006 057 208

(51) Int. Cl.
*G01F 1/68* (2006.01)
(52) U.S. Cl. .................................................. 73/204.23
(58) Field of Classification Search .................. None
See application file for complete search history.

(56) References Cited

U.S. PATENT DOCUMENTS
5,321,983 A   6/1994 Nagata
5,983,700 A  11/1999 Yamaguchi
2003/0146758 A1 * 8/2003 Koike et al. ................... 324/453
2006/0117845 A1   6/2006 Padmanabhan
2007/0220968 A1 * 9/2007 Tokuyasu et al. .......... 73/204.26

FOREIGN PATENT DOCUMENTS
EP    0 624242    11/1994
(Continued)

OTHER PUBLICATIONS
Charles G. Lomas, "Fundamentals of Hot Wire Anemometry", Cambridge Univ. Press, 1986.

*Primary Examiner* — Harshad R Patel
(74) *Attorney, Agent, or Firm* — Bacon & Thomas, PLLC

(57) ABSTRACT

An apparatus for determining and/or monitoring mass flow of a fluid medium through a pipeline, or through a measuring tube. The apparatus includes two temperature sensors and a control/evaluation unit. The two temperature sensors are arranged in a region of a housing facing the medium and in thermal contact with the medium flowing through the pipeline, or through the measuring tube. A first of the temperature sensors is heatably embodied. A second of the temperature sensors provides information concerning the present temperature of the medium. The control/evaluation unit, on the basis of primary measured variables, such as temperature difference between the two temperature sensors and/or heating power fed to the first temperature sensor, ascertains the mass flow of the medium through the pipeline. The control/evaluation unit, in ascertaining the mass flow, provides a correction value for the mass flow and/or for the primary measured variable and/or for a measured value derived from the primary measured variable. And, the control/evaluation unit, in ascertaining the correction value, takes into consideration heat exchange by forced convection and heat exchange by free convection between the temperature sensors and the medium.

6 Claims, 3 Drawing Sheets

FOREIGN PATENT DOCUMENTS

| | | |
|---|---|---|
| EP | 0 628 715 A2 | 12/1994 |
| EP | 1 314 966 A1 | 5/2003 |
| JP | 05157603 A | 6/1993 |
| JP | 2003 042825 A | 2/2003 |
| JP | 2004 093179 A | 3/2004 |
| WO | WO 93/15381 | 8/1993 |
| WO | WO 01/98735 A2 | 12/2001 |

* cited by examiner

THERMAL FLOW MEASURING APPARATUS INCLUDING RTD SENSOR

TECHNICAL FIELD

The invention relates to an apparatus for determining and/or monitoring mass flow of a gaseous medium through a pipeline, or through a measuring tube. The apparatus includes two temperature sensors and a control/evaluation unit. The two temperature sensors are arranged in a region of a housing facing the medium and are in thermal contact with the medium flowing through the pipeline, or through the measuring tube. A first of the temperature sensors is heatably embodied. A second of the temperature sensors provides information concerning the current temperature of the medium. The control/evaluation unit ascertains the mass flow of the medium through the pipeline on the basis of primary measured variables, such as temperature difference between the two temperature sensors and/or heating power, which is fed to the first temperature sensor. The fluid medium is preferably a gas.

BACKGROUND DISCUSSION

Conventional, thermal, flow measuring devices use, most often, two, as much as possible, equally embodied, temperature sensors. For industrial application, the two temperature sensors are usually installed in a measuring tube, in which the flow of a measured medium is measured. One of the two temperature sensors is a so-called active temperature sensor, which is heated by means of a heating unit. Provided as heating unit is either an additional resistance heating element, or the temperature sensor is itself a resistance element, e.g. an RTD (Resistance Temperature Device) sensor, which is heated by conversion of electrical power, e.g. by a corresponding variation of the measuring, electrical current. The second temperature sensor is a so-called passive temperature sensor: It measures the temperature of the medium.

Usually, in a thermal, flow measuring device, the heatable temperature sensor is so heated, that a fixed temperature difference is set between the two temperature sensors. Alternatively, it is also known to supply, via an open, or closed, loop control unit, a constant heating power.

If there is no flow in the measuring tube, then an amount of heat constant with time is required for maintaining the predetermined temperature difference. If, in contrast, the medium to be measured is moving, then the cooling of the heated temperature sensor is essentially dependent on the mass flow of the medium flowing past. Since the medium is colder than the heated temperature sensor, heat is transported away from the heated temperature sensor by the flowing medium. In order, thus, to maintain the fixed temperature difference between the two temperature sensors in the face of a flowing medium, an increased heating power is required for the heated temperature sensor. The increased heating power is a measure for the mass flow, i.e. the mass flow of the medium through the pipeline.

If, in contrast, a constant heating power is fed, then the temperature difference between the two temperature sensors lessens as a result of the flow of the medium. The particular temperature difference is then a measure for the mass flow of the medium through the pipeline, or through the measuring tube.

There is, thus, a functional relationship between the heating energy needed for heating the temperature sensor and the mass flow through a pipeline, or through a measuring tube. This dependence of the heat transfer coefficient on the mass flow of the medium through the measuring tube, or through the pipeline, is utilized in thermal, flow measuring devices for determining the mass flow. Devices, which operate according to this principle, are available from the assignee under the mark 't-mass'.

In order to achieve a desired high accuracy of measurement, thermal, flow measuring devices are first calibrated against a highly accurately measuring master, for example, against a Coriolis, flow measuring device. The known calibration method is based on the assumption that the heat exchange between temperature sensor and medium occurs exclusively via forced convection. This assumption loses its validity in the region of smaller flow velocities of the medium. Investigations have shown, that, exactly in the region of smaller flow velocities, heat exchange as a result of free, or natural, convection plays a large role. Therefore, correction based on purely forced convection is associated with relatively large measurement errors.

From EP 0 624 242 B1, already a thermal, flow measuring device is presented, which takes into consideration the heat transfer between fluid and temperature sensor as a result of free convection. In the region of smaller flow velocities, thus, especially, in the case of flow velocities smaller than 1 m/sec, there occurs, besides the forced convection, additionally heat transfer based on free convection. If this heat transfer as a result of free convection is ignored, then relatively large measurement errors occur in the case of small flow velocities.

SUMMARY OF THE INVENTION

An object of the invention is to provide a thermal, flow measuring device for the highly accurate measuring of mass flow of fluid media over the entire velocity range.

The object is achieved by the feature that the control/evaluation unit, in ascertaining mass flow, provides a correction value for the mass flow and/or for the primary measured variable and/or for a measured value derived from the primary measured variable; in ascertaining the correction value, the control/evaluation unit takes into consideration, besides heat exchange through forced convection, also heat exchange by free convection between the temperature sensors and the medium. In this way, also in the region of low flow velocities, a high accuracy of measurement can be achieved, so that the thermal, flow measuring device of the invention can be applied over the entire range of flow velocities.

In an advantageous further development of the flow measuring device of the invention, the control/evaluation unit ascertains the correction value for the mass flow, and/or for the primary measured variable, and/or for the measured value derived from the primary measured variable, as a function of the temperature and the flow velocity of the fluid medium. Especially, it is provided, that the correction value for the mass flow and/or for the primary measured variable and/or for the measured value derived from the measured variable is ascertained as a function of the term $\sqrt{T} \cdot u$. In such case, T is the temperature of the fluid medium and u the flow velocity of the fluid medium.

A preferred further development of the thermal, flow measuring device of the invention provides, that the control/evaluation unit performs a determining of the correction value of the mass flow and/or the primary measured variables and/or the measured value derived from the mass flow only under flow conditions, under which the correction value, which takes into consideration the heat transfer by free convection, exceeds a predetermined threshold value. If, as upper limit, a measurement error of 2% is provided, then the correction method of the invention first is activated, when, by disregarding the contribution of the free convection, this predetermined threshold value is exceeded.

Especially, the control/evaluation unit activates the method of the invention, or calculates the correction value according to the invention, when the flow velocity of the fluid medium is smaller than 1 m/sec. On the basis of experience, the influence of free convection becomes strongly noticeable in this velocity range.

In a preferred embodiment of the thermal, flow measuring device of the invention, the control/evaluation unit ascertains the functional dependence of the term $\sqrt{T} \cdot u$ on the mass flow, or on a variable uniquely associated with the mass flow, on the basis of experimental data or on the basis of a mathematical model. The control/evaluation unit ascertains the functional dependence preferably via an interative, approximation method. Preferably, the functional dependence is determined by the Nusselt number and/or the Reynolds number.

BRIEF DESCRIPTION OF THE DRAWINGS

The invention will now be explained in greater detail on the basis of the drawing, the figures of which show as follows.

DETAILED DISCUSSION IN CONJUNCTION WITH THE DRAWINGS

Figure 1:
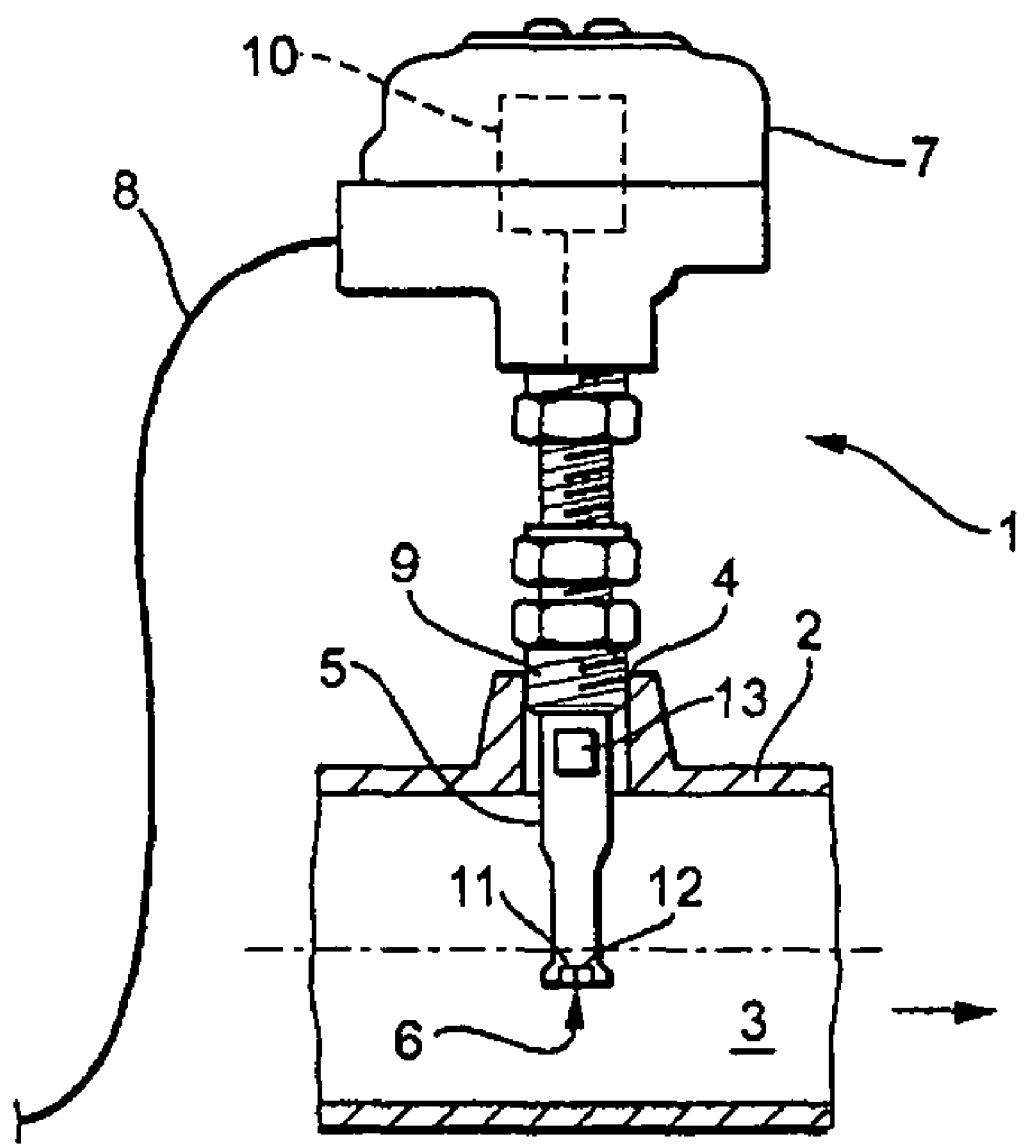
FIG. 1 a schematic drawing of an embodiment of the thermal, flow measuring device of the invention.

FIG. 1 shows a schematic drawing of the thermal, flow measuring device of the invention 1, including a thermal, flow sensor 6 and a measurement transmitter 7. The flow measuring device 1 is secured, via a screw thread 9, in a nozzle 4 located on the pipeline 2. Located in the pipeline 2 is the flowing medium 3. Alternatively, an option is to construct the flow measuring device 1 with an integrated measuring tube as an inline, measuring device.

The temperature measuring device, i.e. the essential part of the flow sensor 6, is located in the region of the housing 5 facing the medium 3. The operating of the temperature sensors 11, 12 and/or the evaluation of the measuring signals delivered from the temperature sensors 11, 12 occurs via the control/evaluation unit 10, which is arranged in the illustrated case in the measurement transmitter 7. Via connection 8, there is communication with a remote, control location (not separately illustrated in FIG. 1).

As already earlier mentioned, at least one of the two temperature sensors 11, 12 can be an electrically heatable, resistance element, a so-called RTD-sensor. Of course, in connection with the solution of the invention, also a usual temperature sensor, e.g. a Pt100 or Pt1000, or a thermocouple, can be applied, associated with a thermally coupled, heating unit 13. Heating unit 13 is, in FIG. 1, arranged in the housing 5 and thermally coupled to the heatable temperature sensor 11, 12, while being largely decoupled from the medium. The coupling, or the decoupling, as the case may be, occurs, preferably via the filling of corresponding intermediate spaces with, respectively, thermally well conductive and thermally poorly conductive, material. Preferably, potting compound is used for this.

With the flow measuring device 1, mass flow can be measured continuously; alternatively, the flow measuring device 1 can be used as a switch, which always displays the changing of a switch state, when at least one predetermined limit value is subceeded or exceeded.

Advantageously, moreover, it is provided, that both temperature sensors 11, 12 are heatably embodied, wherein the desired functioning of the first temperature sensor 11 or the second temperature sensor 12 is determined by the control/evaluation unit 10. For example, an option is that the control/evaluation unit 10 operates the two temperature sensors 11, 12 alternately as active or passive temperature sensor 11, 12 and ascertains the measured value of flow via an averaging of the measured values delivered from both temperature sensors 11, 12.

According to the invention, an option is provided, which, in the determining of mass flow by a thermal, flow measuring device 1, takes into consideration, besides the heat exchange between the temperature sensors 11, 12 and the medium 3 on the basis of forced convection, also the heat exchange occurring on the basis of free convection. Since free convection becomes significant especially in the region of smaller flow velocities u, the apparatus of the invention achieves a high accuracy of measurement also in the region of smaller flow velocities u of the medium 3, thus where u is smaller than 1 m/sec. The flow measuring device 1 of the invention is, thus, universally applicable over the entire flow range—and, indeed, independently of the type of fluid and independently of the physical conditions, such as pressure p and temperature T, reigning in the fluid. The correction of the invention for gaseous media 3 will now be explained in further detail, using the concept that, in slowly flowing gases, free convection plays a strong role.

A known flow measuring device available from the assignee under the mark 't-mass 65' utilizes for calibration purposes a mathematical model, wherein only forced convection is taken into consideration.

According to a known mathematical model, forced convection can be described via the Nusselt number $Nu_{forced,D}$ in the following manner:

$$Nu_{forced,D} = \left[0.3 + \frac{0.62 \cdot Re_D^{1/2} \cdot Pr^{1/3}}{[1 + (0.4/Pr)^{2/3}]^{1/4}} \cdot \left[1 + \left(\frac{Re_D}{282000}\right)^{5/8}\right]^{4/5}\right] \quad (1)$$

In such case, $P_r$ is the Prandtl number, which is defined as follows:

$$Pr = \frac{\mu \cdot c_p}{k_f} \quad (2)$$

In such case, $\mu[kg/(m \cdot s)]$ designates the dynamic viscosity and $c_p[J/(kg \cdot K)]$ the specific heat capacity of the medium 3; $k_f[W/(m \cdot K)]$ is the thermal conductivity of the medium 3.

The Reynolds number $Re_D$ is defined as follows:

$$Re_D = \frac{\rho \cdot u \cdot D}{\mu} \quad (3)$$

In such case, $\rho \cdot u\ [kg/(m^2 \cdot s)]$ represents the specific mass flow, D[m] the diameter of the part of the temperature sensor 11, 12 coming in contact with the medium 3 and $\mu[kg/(m \cdot s)]$, again, the dynamic viscosity. If, thus, the Reynolds number Re is known, then also the mass flow can be determined.

The gas properties, $\mu$, $c_p$ and $k_f$, are functionally dependent on the gas type, the temperature T and the pressure p of the gas. In the mathematical model used to this point in time for transfer of heat, the part of the heat transfer resulting from free convection was only taken into consideration via the calibration constant 0.3 in Equation (1). If the fluid medium 3 is a gas, and, moreover, the present flow conditions deviate strongly from the flow conditions, under which the calibrating of the flow measuring device 1 against the master, flow measuring device was done, then occasionally considerable measurement errors occur in the region of smaller flow velocities u. Here, the invention enters. According to the invention, an optimized model for the heat transfer is provided, which enables, also in the region of smaller flow velocities, the achieving of a high accuracy of measurement.

In the book, 'Fundamentals of Heat and Mass Transfer', by F. P. Incropera and D. P. DeWitt, published 1996 by John Wiley and Sons, the following correlation is given for the Nusselt number $Nu_{free,D}$ of an elongated, horizontally arranged cylinder of diameter D:

$$Nu_{free,D} = \left[0.6 + \frac{0.387 \cdot Ra_D^{1/6}}{[1 + (0.559/Pr)^{9/16}]^{8/27}}\right]^2 \quad (4)$$

In such case, the Rayleigh number $Ra_D$ is defined as follows:

$$Ra_D = Gr_D \cdot Pr \quad (5)$$

Pr is the Prandtl number and the Grasshof number $Gr_D$ is defined as:

$$Gr_D = \frac{g \cdot \beta \cdot (T_s - T_\infty) \cdot D^3}{v^2} \quad (6)$$

In such case, g designates the acceleration of gravity, $\beta$ the coefficient of expansion of the flowing medium 3 and v the kinematic viscosity of the medium 3. Under the assumption, that the fluid medium 3 is an ideal gas, there results for the coefficient of expansion the following dependence on the temperature of the gaseous medium 3:

$$\beta = \frac{1}{T_\infty} \quad (7)$$

$T_\infty[K]$ is the temperature of the gas, and $T_s - T_\infty$ is the temperature difference between the heated cylinder, in which the temperature sensor 11 is arranged, or which approximately represents the temperature sensor 11, and the surrounding gaseous medium 3. In the case of the known thermal, flow measuring device 't-mass 65', the temperature controller controls the temperature difference to a value of about 10 K. In the following, it is likewise assumed, that the temperature difference is constant.

$$(T_s - T_\infty) = \Delta T = const. \quad (8)$$

The kinematic viscosity $v[kg/(m \cdot s)]$ is obtained from the equation:

$$v = \frac{\mu}{\rho} \quad (9)$$

In such case $\rho[kg/m^3]$ is the density of the gas.

Based on the above provided correlations, in real-time, the effect, which the free convection has on the determining of the mass flow of a gaseous medium 3 through the pipeline 2, is taken into consideration.

In a preferred embodiment, it is, to a first approximation, assumed, that the mass flow, which is caused by free convection, depends only on the variable term: $T_\infty^{1/2} \cdot u$, wherein u is the present flow velocity of the medium and $T_\infty$ the temperature of the gaseous medium 3. As is evident from FIG. 2, the free convection is, to a first approximation, independent of the type the gas, or the type the fluid medium 3, as well as being independent of the temperature T of the medium 3 and the pressure p reigning in the medium 3. Thus, the flow measuring device 1 of the invention delivers independently of the type of medium 3 and the flow conditions in the medium 3, the desired high accuracy of measurement.

Figure 2:
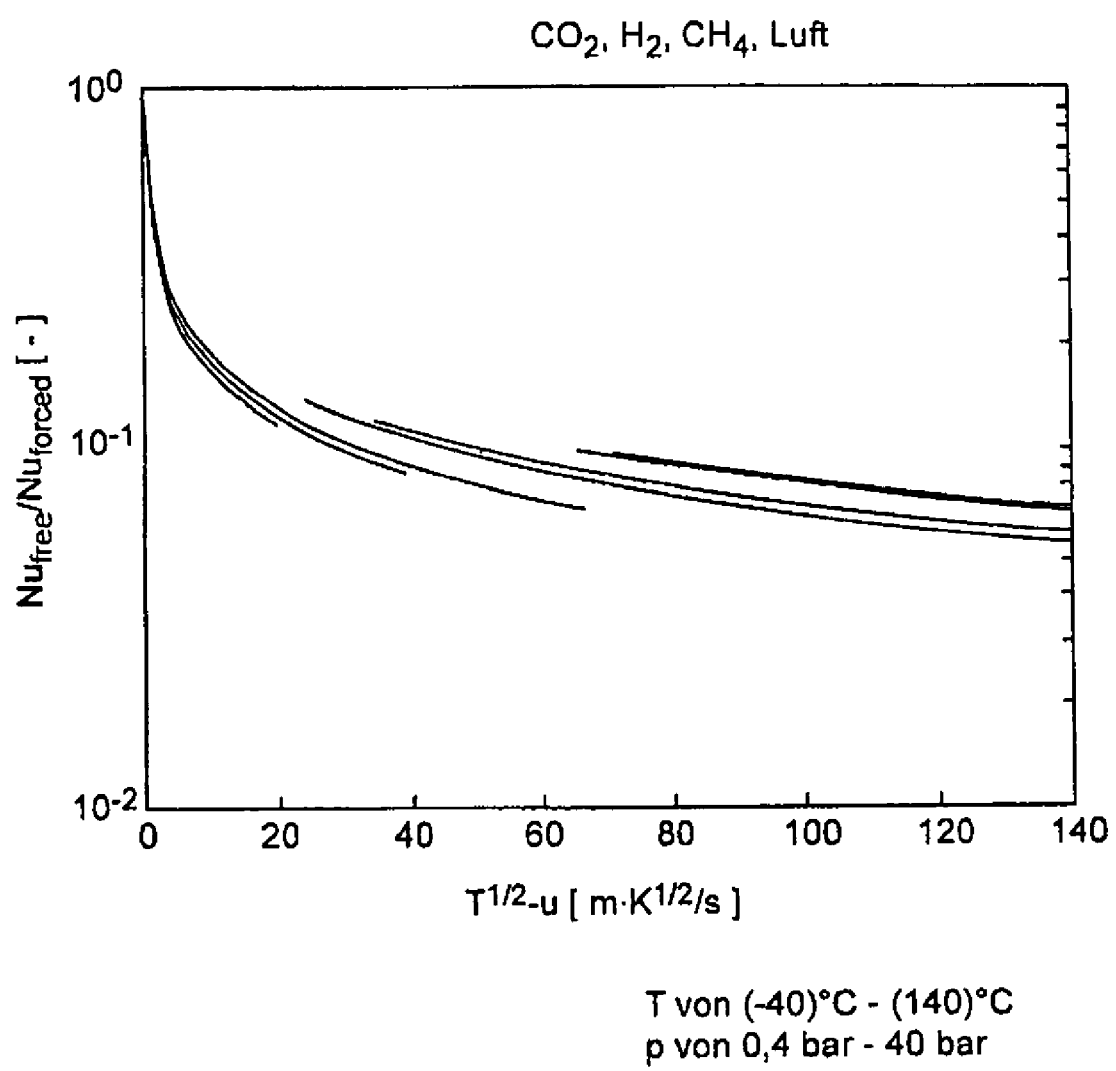
FIG. 2 a representation of the functional dependence of the quotient of the Nusselt number in the case of free convection and the Nusselt number in the case of forced convection on the term $\sqrt{T} \cdot u$.

The corresponding functional relationship is—as already stated—to be seen in FIG. 2, where the quotient of the Nusselt number for free convection and the Nusselt number $Nu_{forced,D}$ for forced convection versus the variable $T_\infty^{1/2} \cdot u$ is plotted for different gases: air, carbon dioxide, methane, hydrogen. Furthermore, the measurements were performed in the face of different environmental conditions. The temperature range lay between −40 deg ° C. to 140° C., and the pressure range extended from 0.4 bar to 40 bar. In spite of the very different environmental conditions, the values lie approximately on well defined curves, which can be described by functions f.

Furthermore, it is assumed, that the Nusselt number for free convection and the Nusselt number for forced convection satisfy the following correlation:

$$Nu^n = Nu^n_{free,D} + Nu^n_{forced,D} \quad (10)$$

This equation is taken from the book: 'Combined Free and Forced Convection Around Immersed Bodies', by S. W. Churchill, published 1983, by the Hemisphere Publishing Corporation.

Equation (10) can be transformed as follows:

$$\frac{Nu}{Nu_{forced,D}} = \left(1 + \left(\frac{Nu_{free,D}}{Nu_{forced,D}}\right)^n\right)^{\frac{1}{n}} \quad (11)$$

With this correlation, the influence of free convection can be taken into consideration in real-time in the case of determining mass flow of a medium 3 through a pipeline 2.

The control/evaluation unit 10 works in the case of calibration according to a first embodiment illustrated in FIG. 3 as follows: From the primary measured variables P and $\Delta T$, the heat transfer coefficient and the Nusselt number Nu are ascertained in a mathematical model 15. The mass-flow is ascertained from a reference device, e.g. a Coriolis flow measuring device. From the mass flow and the physical properties of the medium 3 ascertained in a gas calculator 14, the Reynolds number and the flow velocity are ascertained. The flow velocity and the measured temperature of the medium are used in the correction calculation 16, in order to calculate from the Nusselt number Nu the share of the forced convection $Nu_{forced,D}$. In this regard, for example, Equation (11) can be taken into consideration. The Reynolds number and the Nusselt number, which describe the forced convection $Nu_{forced,D}$, are stored in the calibration curve 17.

While the Nusselt number $Nu_{forced,D}$ for forced convection in Equation (11) is a function of the Reynolds number Re, the ratio of the Nusselt number $Nu_{free,D}$ for free convection to the Nusselt number $Nu_{forced,D}$ for forced convection depends on the term $T_\infty^{1/2} \cdot u$. The exact functional relationship f can be ascertained either experimentally or calculated via a mathematical model. If the exact shape of the curve is left open, then the mathematical, functional dependence becomes:

$$\frac{Nu_{free,D}}{Nu_{forced,D}} = f(T_\infty^{1/2} \cdot u) \quad (12)$$

Upon application of the Equation (1), the Nusselt number $Nu_{forced,D}$ for the forced convection is mathematically calculated, by solving Equation (1) with three constant coefficients, wherein the three coefficients C(3), C(4), C(5) are numerically optimizable:

$$Nu_{forced,D} = \left[ C(3) + \frac{C(4) \cdot Re_D^{C(5)} \cdot Pr^{1/3}}{[1 + (0.4/Pr)^{2/3}]^{1/4}} \cdot \left[ 1 + \left(\frac{Re_D}{282000}\right)^{5/8} \right]^{4/5} \right] \quad (13)$$

Figure 3:
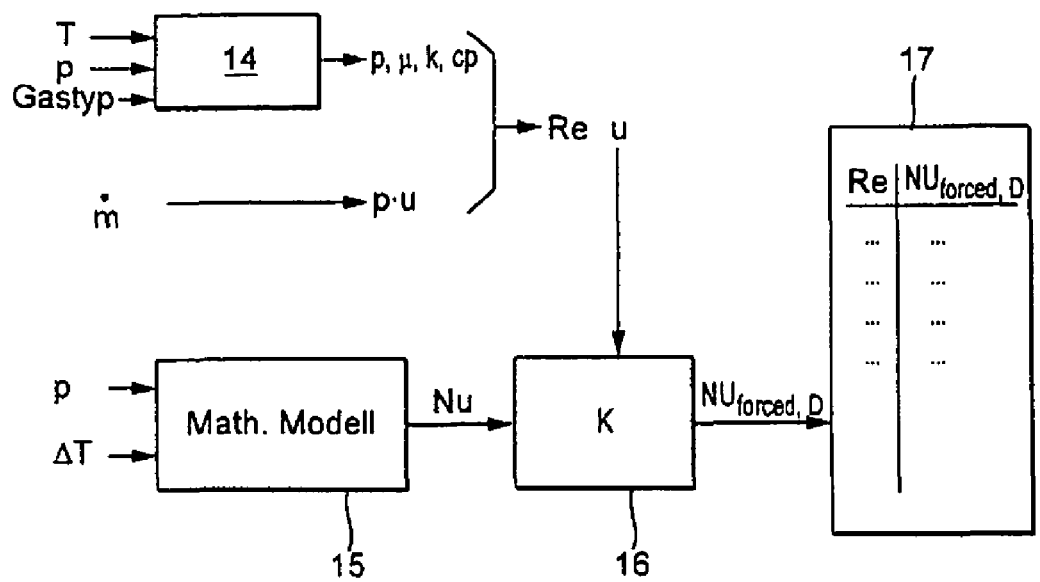
FIG. 3 a block diagram, which shows the individual working steps of the thermal, flow measuring device of the invention in the case of calibration.

In order that the heat transfer as a result of free convection is taken into consideration, the Nusselt number $Nu_{forced,D}$ for forced convection can be corrected using Equation (11)—this correction occurs at point 16 in FIG. 3:

$$Nu = Nu_{forced,D} \cdot (1 + f(T_\infty^{1/2} \cdot u)^n)^{\frac{1}{n}} \quad (14)$$

Figure 4:
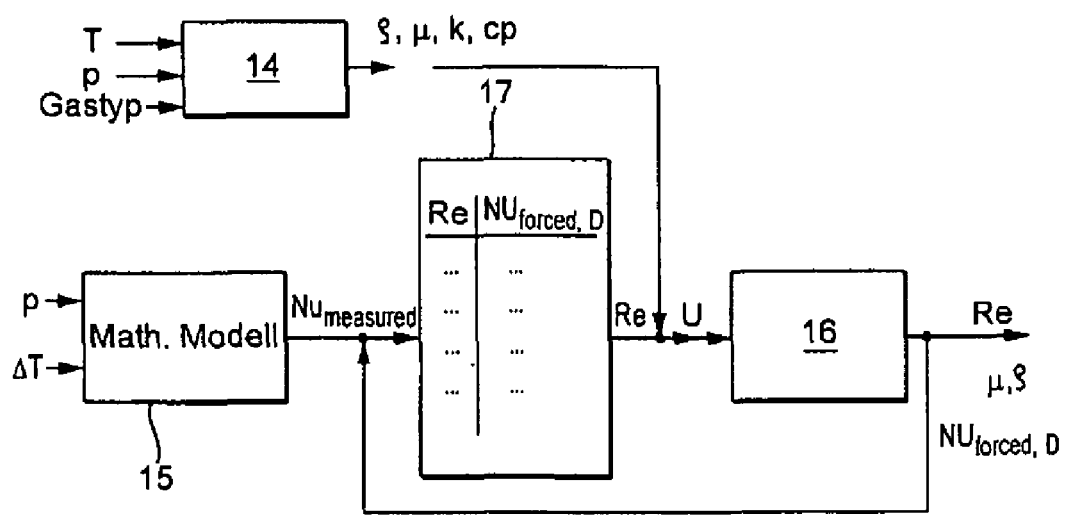
FIG. 4 a block diagram, which shows the individual working steps of the thermal, flow measuring device of the invention in the case of calibration, wherein mass flow is ascertained via an interative method.

In an advantageous embodiment of the apparatus of the invention, this governing Nusselt number Nu is then fitted via an iteration method to the Reynolds number Re. FIG. 4 shows this solution. The Nusselt number Nu, which is stored in the calibration table 17, corresponds, in such case, to the Nusselt number $Nu_{forced,D}$ for forced convection, which has been ascertained during calibration of the flow measuring device 1 at relatively high flow velocities u. If the Nusselt number Nu is known, then the Reynolds number Re can be ascertained uniquely therefrom.

In an advantageous further development of the solution of the invention, the known calibration method is expanded at point 16 by a correction factor, which especially takes into consideration, in the region of smaller flow velocities u, the influence of the free convection on the heat transfer.

In the so-called gas calculator 14, on the basis of the predetermined variables, temperature T of the medium 3, pressure p of the medium 3 and composition of the medium 3, the density ρ, the dynamic viscosity μ, the specific heat conductivity k and the specific heat capacity Cp are calculated. The mass flow is calculated from the product of density ρ and flow velocity u. From knowledge of the above mentioned variables, the Reynolds number Re and then the flow velocity u of the medium 3 are ascertained. Beneath a minimum threshold for the flow velocity u, there occurs at point 16 a correction of the Nusselt number calculated via a mathematical model 15. In the correction of the Nusselt number, the influence of the Grasshof number, which plays a role in the case of free convection, is taken into consideration. For this, the Reynolds number of the medium 3 is ascertained on the basis of the corrected Nusselt number.

Additionally or alternatively, procedure is as follows: During the measuring, the Nusselt number $Nu_{measured}$ is ascertained via the heating power P supplied to the heated temperature sensor 11 in the case of the temperature difference ΔT. This Nusselt number $Nu_{measured}$ is then utilized, in order to ascertain, to a first approximation, the Reynolds number Re from the calibration table 17. With this first approximation of the Reynolds number Re, the flow velocity u and the functional dependence f between the measured Nusselt number $Nu_{measured}$ and the Nusselt number $Nu_{forced,D}$ for the forced convection are calculated:

$$Nu_{forced,D,meas} = \frac{Nu_{measured}}{[1 + f(T_\infty^{1/2} \cdot u)^n]^{\frac{1}{n}}} \quad (15)$$

With this improved, more exact value for the forced Nusselt, number equation, in turn, on the basis of the calibration table 17, the correspondingly improved Reynolds number Re is won; then, the flow velocity u and the functional dependence f are calculated and, therefrom, the Reynolds number Re ascertained. These method steps are successively performed, until the Reynolds number Re assumes an approximately constant value. This value of the Reynolds number Re is then used for determining the mass flow.

LIST OF REFERENCE CHARACTERS

1 thermal, flow measuring device
2 pipeline/measuring tube
3 medium
4 nozzle
5 housing
6 sensor
7 measurement transmitter
8 connecting line
9 screw thread
10 control/evaluation unit
11 first temperature sensor
12 second temperature sensor
13 heating unit
14 gas calculator
15 mathematical, physical model
16 correction calculation
17 calibration table

The invention claimed is:

1. An apparatus for determining and/or monitoring the mass flow of a fluid medium through a pipeline, or through a measuring tube, comprising:

two temperature sensors and a control/evaluation unit, wherein:

said two temperature sensors are arranged in a region of a housing facing the medium and are in thermal contact with the medium flowing through the pipeline, or through the measuring tube;

a first temperature sensor of said two temperature sensors is heatably embodied, and a second temperature sensor of said two temperature sensors provides information concerning current temperature of the medium;

said control/evaluation unit, on the basis of primary measured variables, such as temperature difference between said two temperature sensors and/or heating power, which is fed to said first temperature sensor, ascertains mass flow of the medium through the pipeline;

said control/evaluation unit, in ascertaining mass flow, provides a correction value for the mass flow and/or for the primary measured variable and/or for a measured value derived from the primary measured variable; and said control/evaluation unit, in ascertaining the correction value, takes into consideration heat exchange by forced convection and heat exchange by free convection between said temperature sensors and the medium, wherein:

said control/evaluation unit ascertains the correction value for the mass flow and/or for the primary measured variable and/or for the measured value derived from the primary measured variable as a function of temperature and flow velocity of the fluid medium; and said control/evaluation unit ascertains the correction value for the mass flow and/or for the primary measured variable and/or for the measured value derived from the measured variable as a function of the term ($\sqrt{T} \cdot u$), wherein T is the temperature of the fluid medium and u the flow velocity of the fluid medium.

2. The apparatus as claimed in claim 1, wherein:

said control/evaluation unit performs a determining of the correction value of the mass flow and/or the primary measured variables and/or the measured value derived from the mass flow at flow conditions, at which the correction value, which takes into consideration heat transfer by free convection, exceeds a predetermined threshold value.

3. The apparatus as claimed in claim 2, wherein:

said control/evaluation unit calculates the correction value, or takes into consideration heat transfer by free convection, when the flow velocity of the fluid medium is smaller than 1 m/sec.

4. The apparatus as claimed in claim 1, wherein:

said control/evaluation unit ascertains functional dependence of the term ($\sqrt{T} \cdot u$) on the mass flow, or on a variable uniquely associated with the mass flow, on the basis of experimental data or on the basis of a mathematical model.

5. The apparatus as claimed in claim 1, wherein:

said control/evaluation unit ascertains the correction value via an interative, approximation method.

6. The apparatus as claimed in claim 1, wherein:

the fluid medium comprises a gas.

* * * * *